March 25, 1947.    P. GLASS    2,417,868
ELECTRIC MOTOR SPEED CONTROL CIRCUIT
Filed May 31, 1943    2 Sheets-Sheet 1
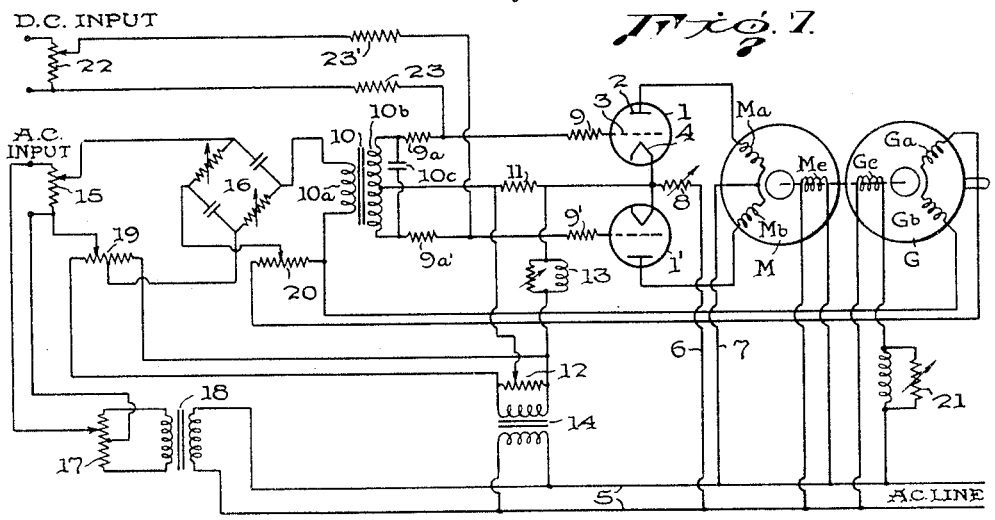
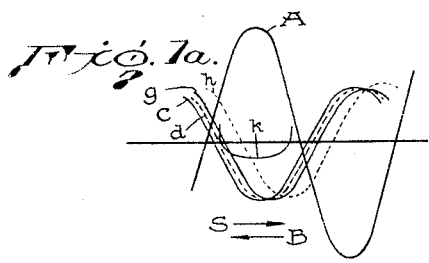
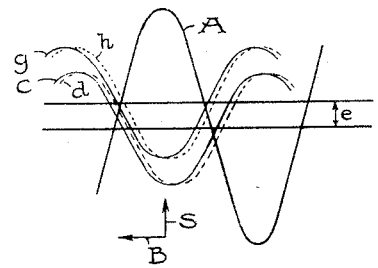
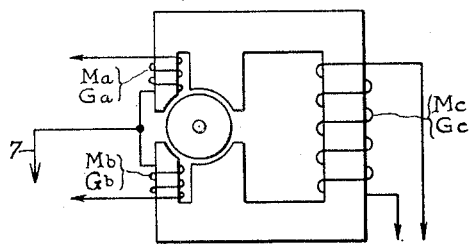
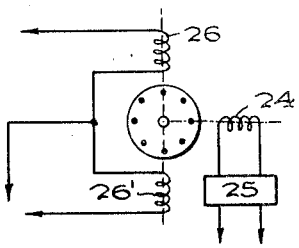
INVENTOR.
PAUL GLASS
BY
*Ralph B. Stewart*
ATTORNEY March 25, 1947.　　　　P. GLASS　　　　2,417,868
ELECTRIC MOTOR SPEED CONTROL CIRCUIT
Filed May 31, 1943　　　　2 Sheets-Sheet 2
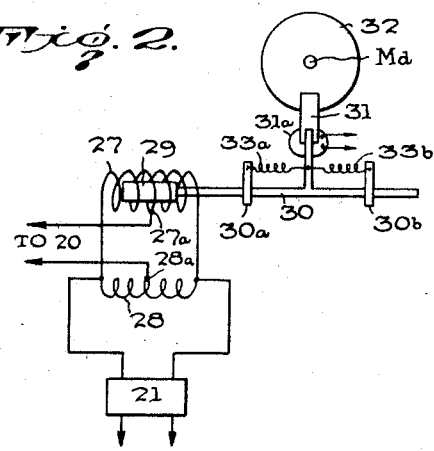
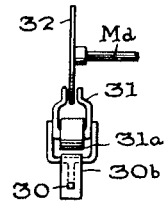
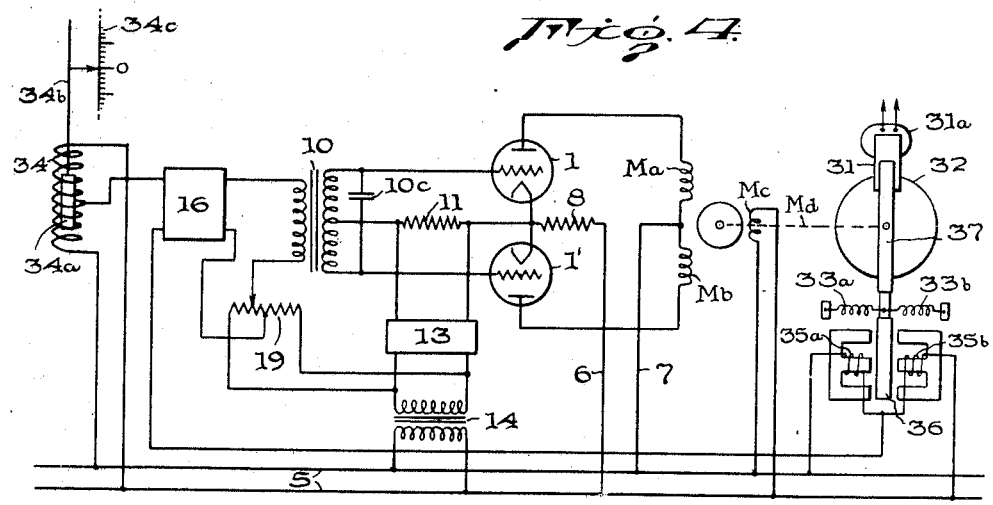
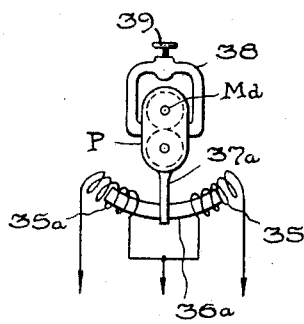
INVENTOR.
PAUL GLASS
BY
*Ralph B. Stewart*
ATTORNEY Patented Mar. 25, 1947

2,417,868

UNITED STATES PATENT OFFICE 2,417,868

ELECTRIC MOTOR SPEED CONTROL CIRCUITS

Paul Glass, Chicago, Ill., assignor to Askania Regulator Company, a corporation of Illinois Application May 31, 1943, Serial No. 489,208

14 Claims. (Cl. 172—274)

1

This invention relates to control circuits for regulating or controlling the speed of a power motor in response to a signal of variable amplitude supplied to the control circuit.

According to the preferred form of my invention, the direction of rotation of the power motor is controlled in accordance with the polarity or sense of the signal, and the speed of the motor is controlled in accordance with the amplitude of the signal.

The power motor is energized from a source of alternating current, and the amount of power supplied to the motor is controlled by a vacuum tube of the gaseous discharge type which in turn is controlled by the input signal of variable amplitude introduced into its grid circuit. An alternating current biasing potential is supplied to the grid circuit from the A. C. source and has a phase displacement of substantially 180° with respect to the anode voltage and an amplitude greatly in excess of the value required to prevent firing of the tube in the absence of a signal. Where the signal is an alternating current signal, it has the same frequency as the A. C. source and has a phase angle leading the anode voltage by substantially 90°. A counterbalancing A. C. voltage is supplied to the input circuit from a speed responsive device responsive to the speed of the power motor, the counterbalancing voltage having the same frequency as the input signal and being opposite in phase thereto.

Where the motor operates in only one direction in accordance with variations in amplitude of a signal, only one control tube is required, but where the motor is to operate in opposite directions in response to variations in polarity or sense of the signal, two control tubes are required, one for each direction of operation.

In at least one form of the invention the motor speed may be controlled either by an A. C. signal or a D. C. signal.

My invention is also concerned with speed responsive devices for producing an alternating current of fixed frequency and of an amplitude which varies with speed and also reverses in phase with reversal in the direction of rotation. In the preferred form of my invention, the A. C. balancing voltage is supplied by a pilot generator in the form of a shaded pole motor driven by the power motor, the two shaded pole windings being connected in series opposition to supply the balancing voltage.

Various forms of my control circuits are shown in the accompanying drawing in which:

Figure 1 illustrates the preferred form of the invention;

Figures 1a and 1b are wave diagrams illustrating the operation of Figure 1;

Figure 1c is a diagram illustrating one form

2 of shaded pole motor which may be used both as the power motor and the pilot generator;

Figures 1d and 1e show other types of power motors which may be employed;

Figures 2 and 3 show another type of speed responsive device for supplying the balancing A. C. signal, Figure 3 being a side view of certain elements shown in Figure 2;

Figure 4 is a diagram showing a control circuit utilizing a modification of the speed responsive device shown in Figure 2 and a different arrangement for supplying the reversible control signal to the input circuit; and Figure 5 shows another form of speed responsive device.

Referring to Figure 1 the variable speed power motor to be controlled is shown at M. This motor is diagrammatically represented as being a shaded pole motor of the type shown in Figure 1c having shaded pole windings Ma and Mb and a field winding Mc, but the motor may be of other types as explained below. The control circuit involves two electron tubes 1 and 1' of the gaseous discharge type, each embodying a plate 2, a grid 3 and a cathode 4. The plate circuit of tube 1 is connected to supply current to shaded pole winding Ma from an alternating current circuit 5 through connections 6 and 7, including a current limiting resistance 8. In a like manner, the plate circuit of tube 1' is connected to supply current to shaded pole winding Mb through connections 6 and 7 and resistance 8. Thus supply voltages of the same phase are supplied to the anodes of tubes 1 and 1' from supply circuit 5. The field winding Mc is connected directly to supply circuit 5. The grid circuit of tube 1 includes in series resistances 9, 9a, one half of the secondary winding 10b of input transformer 10, and resistance 11. Likewise the grid circuit of tube 1' includes in series resistances 9' and 9a', the other half of the secondary winding 10b of input transformer 10 and resistance 11. A condenser 10c is shunted across the secondary 10b to prevent high frequency disturbances from affecting the operation of the tubes.

An alternating current biasing potential of adjustable amplitude and phase is supplied across the terminals of resistance 11 through a potentiometer 12 and a phase shifter 13 which in turn are supplied from transformer 14 connected to supply circuit 5. Phase shifter 15 is adjusted so that the A. C. biasing voltage leads the anode voltage of tubes 1 and 1' by an angle somewhat less than 180°. The function of phase shifter 13 is to overcome the "dead zone" of tubes 1 and 1' by shifting the phase of the biasing potential to a value such that a very small signal voltage supplied to the primary 10a of input transformer 10 will cause one or the other of the tubes to fire.

The input signals are supplied to transformer 10 through a potentiometer 15 and through a phase shifter 16 which shifts the phase of the signal to lead the anode voltage of tubes 1 and 1' by substantially 90°. The input signals may be derived from any source which is to control the operation of the motor. The signals should have the same frequency as the frequency of supply circuit 5. One suitable arrangement is shown in Figure 1 involving a center tap potentiometer 17 supplied from circuit 5 through a transformer 18. Shifting the contact on the potentiometer 17 to opposite sides of the center tap will impress A. C. signal voltages of opposite phase and variable amplitude across the terminals of input potentiometer 15.

A center tapped equalizing potentiometer 19 is connected in the input circuit in front of phase shifter 16 and is supplied from the supply circuit 5 from the secondary of transformer 14. The function of equalizer 19 is to supply additional A. C. biasing voltages to the grids of tubes 1 and 1' in order to equalize the operation of these two tubes, that is, in order to condition these two tubes for firing at the same signal values. The two equalizing voltages are opposite in phase and serve to shift in opposite directions the phase angle of the resultant A. C. grid biasing voltages of tubes 1 and 1'. This feature of my invention is being claimed in my copending application Serial No. 489,207, filed May 31, 1943. The equalizing potentiometer is a refinement which is not essential and may be omitted where it is not essential that both tubes fire at the same signal value.

The speed responsive device for generating a balancing A. C. voltage to be introduced into the input circuit in opposition to the signal voltage is a pilot generator G driven by the motor M. In Figure 1 the pilot generator is diagrammatically represented as a structure of the same type as the motor M, that is, a shaded pole motor of the general construction shown in Figure 1c having two shaded pole windings $Ga$ and $Gb$ and a field winding $Gc$. Windings $Ga$ and $Gb$ are connected in series opposition to a potentiometer 20 connected in the input circuit. A phase shifter 21 is included in the supply circuit of field winding $Gc$ in order to adjust the balancing voltage to a condition of opposite phase with respect to the signal voltage. Another purpose of phase shifter 21 is to limit the current in the field coil $Gc$ so as to eliminate harmonics in the voltage generated in shaded pole windings $Ga$ and $Gb$.

The operation of Figure 1 may be explained by reference to Figure 1a. Curve $A$ represents the anode voltages of tubes 1 and 1'. Curve $c$ represents the resultant A. C. biasing voltage supplied to one of the two grids from potentiometer 12 through phase shifter 13 and from the equalizer 19. As will be seen, curve $c$ leads curve $A$ by slightly less than 180°. The dotted curve $d$ indicates the critical position of the A. C. biasing voltage which just touches the characteristic curve $k$ and causes firing of the two tubes. Curve $d$ is slightly retarded in phase with respect to curve $c$. Since the signal voltages are added to the A. C. biasing voltages at 90° phase displacement, the signal voltage will cause the resultant grid voltage of one tube to be retarded in phase and will cause firing of that tube, while the other grid voltage will be advanced in phase and will prevent firing of the second tube. For example, an input signal which causes the curve $c$ to shift beyond the curve $d$ in the direction of the arrow S to the position $g$ will cause the associated tube to fire at the beginning of each positive half-cycle of the anode voltage $A$. This will cause the motor M to operate in one direction. When the motor is stationary, voltages of equal amplitude and opposite phases are induced in shaded pole windings $Ga$ and $Gb$ of the pilot generator, and no balancing voltage is applied to the input circuit from potentiometer 20. As the motor M speeds up, the reaction of the currents set up in the rotating squirrel-cage armature of generator G causes an unbalance of the voltages induced in windings $Ga$ and $Gb$, and the resultant voltage applied to potentiometer 20 is proportional to the speed of the generator, and its phase reverses with the direction of rotation of the generator. The frequency of the balancing voltage is always equal to the frequency of the supply circuit 5. Since the counterbalancing voltage supplied to the input circuit from potentiometer 20 is opposite in phase to the input signal, it tends to shift the phase of the grid voltage in the direction indicated by the arrow B in Figure 1a and thus tends to prevent firing of the tube. When the grid voltage is shifted back to the position $c$ the tube stops firing and the motor begins to slow down. As a consequence, the balancing voltage is reduced and the grid voltage curve now moves to the right in the direction of the arrow S until the tube fires again. Thus, the grid voltage curve oscillates about the critical position $d$. The frequency of oscillation and the ratio of on time to the period of oscillation adjust themselves such that a definite average motor speed is established for a given input signal.

If the sense or phase of the signal is reversed, the tube which formerly was inactive will now become active and the motor will operate in the reverse direction. Reversal of the direction of rotation of generator G will also reverse the phase of the balancing voltage introduced into the input circuit at potentiometer 20, and the regulating action previously explained takes place in the same manner to limit the speed of the motor in accordance with the amplitude of the input signal.

The circuit of Figure 1 may be made responsive to direct current signals by supplying the signals to the grid circuits of tubes 1 and 1'. For example, the signals may be supplied through a potentiometer 22 which is connected on one side through resistance 23 to the grid circuit of tube 1 between resistances 9 and 9$a$, and on the other side through resistance 23' to the grid circuit of tube 1' between resistances 9' and 9$a$'. Resistances 23 and 23', which may be in the form of inductance elements, prevent the D. C. input circuit from influencing the A. C. voltages applied to the grid circuits through transformer 10.

The operation of Figure 1 in response to D. C. signals may be explained by reference to Figure 1b. In this figure the various curves correspond to those shown in Figure 1a, the grid voltage curve for no signal condition being adjusted to the position $c$ to normally prevent firing of both tubes. Upon the application of a positive D. C. signal $e$ to the grid of tube 1, the grid voltage curve is moved upwardly in the direction of the arrow S to the position $h$ which causes the firing of tube 1 at the beginning of each positive alternation of the anode voltage and the motor begins to accelerate. The balancing voltage supplied from generator G operates to shift the grid voltage curve back in the direction of the arrow B in the same manner as in Figure 1a and causes the tube to stop firing. The motor slows down and with the corresponding decrease in the balancing voltage the grid voltage curve shifts back to the right and causes firing of the tube, and this action is repeated periodically so that the motor speed is automatically maintained at an average value proportional to the value of the applied signal voltage e. When the signal voltage causes the grid of one tube to go positive, the grid of the other tube goes negative by a corresponding amount and prevents firing of the tube. If the applied signal reverses in polarity, the tubes will also reverse in operation and cause reversal in the direction of rotation of the motor M. The circuit of Figure 1 will also respond to alternating current signals supplied to potentiometer 22.

It is not essential that the power motor should be of the shaded pole type. It may be a direct current motor having an armature connected to the supply conductor 7 and two field windings F and F' whose circuits are completed through the armature and through the plate circuits of tubes I and I', respectively, as shown in Figure 1d. Still another form of motor is shown in Figure 1e which is a diagrammatic showing of a two-phase induction motor having one phase winding 24 supplied through a phase shifter 25, while the second phase circuit includes winding 26 or 26' controlled respectively by tubes I and I' and determining the direction of rotation of the motor. Windings 26 and 26' are wound on the same axis, while winding 24 is wound on an axis located at right angles to the axis of windings 26 and 26' in the usual manner. Phase shifter 25 maintains the current in winding 24 in phase quadrature with the current in windings 26 and 26'.

In Figure 2 I have shown another form of speed responsive device which may be substituted for the pilot generator of Figure 1. This arrangement involves a normally balanced bridge formed of two center tapped inductances 27 and 28 connected in parallel and supplied with current from the supply circuit 5 through a phase shifter 21. The two inductances are tapped at 27a and 28a respectively, and these taps are connected to potentiometer 20. Inductance 27 is provided with a movable magnetic core 29 mounted on a sliding bar 30 extending axially out of the coil 27 and being supported by a pair of spaced supports 30a and 30b. A magnet 31 is supported from bar 30, and the poles of this magnet are located on opposite sides of a metal disk 32 mounted on the shaft Md of the power motor. The magnet 31 may be a permanent magnet or it may be provided with a magnetizing winding 31a. The magnet 31 is normally maintained in a central position between stops 30a and 30b by means of a pair of tension springs 33a and 33b.

In the normal position of magnet 31, core 29 is centrally located in coil 27 and no resultant voltage is transmitted from the bridge to the potentiometer 20. If the motor begins rotating in one direction, the eddy currents developed in disk 32 tend to drag the magnet 13 along with the disk and will displace the core 29 against the action of one of the biasing springs 33a or 33b, thus upsetting the balance of the bridge and causing a resultant voltage of predetermined phase to be applied to potentiometer 20, and the amplitude of this voltage will increase with increasing speed of the motor. For the reverse direction of rotation of the motor, the magnet 31, and core 29, will be shifted in the opposite direction from their normal position, and the resultant voltage applied to potentiometer 20 will be opposite in phase with respect to the voltage applied for the reverse direction of rotation. Accordingly, the resultant voltage produced by the device of Figure 2 is reversible in phase according to the direction of rotation of the motor, and the amplitude varies in accordance with the speed of the motor.

In Figure 4 the control signal of reversible phase and variable amplitude is derived in a different manner from Figure 1, and the counterbalancing voltage is supplied by a speed responsive device operating on the same general principle as Figure 2. Elements having the same function as corresponding elements in Figure 1 are represented by like reference numerals. The input signal is derived from an inductance bridge consisting of an inductance coil 34 energized from circuit 5 and having its center tap connected to one terminal of input phase shifter 16. The other parallel path of the bridge includes in series two inductance windings 35a and 35b having E-shaped cores mounted in face to face relation and spaced from each other as shown. Coils 35a and 35b are energized from circuit 5, and the mid point of this circuit is connected to the other terminal of phase shifter 16. A magnetic armature or bridging member 36 is mounted between the cores of coils 35a and 35b and is movable in opposite directions to increase the inductance of one coil and decrease the other coil, and vice versa. One suitable arrangement for mounting armature 36 is shown in Figure 4 where the armature is supported at the lower end of a bar 37 which is pivotally mounted at the axis of the motor shaft Md and is positioned adjacent the metal disk 32 mounted on the motor shaft. Magnet 31 is carried by the upper end of bar 37 and cooperates with disk 32 in the manner described above in connection with Figure 2 to swing the armature 36 towards the core of coil 35a or towards the core of coil 35b depending upon the direction of rotation of the motor. Tension springs 33a and 33b serve to maintain the armature 36 in its central position at times when the motor is not running.

Inductance coil 34 is provided with a sliding core 34a mounted on a sliding bar 34b which has a position indicator cooperating with a scale 34c. When core 34a is in its central position, the inductance bridge is balanced and no signal voltage is applied to the transformer 10. If the core is moved to one side of its central position by movement of the bar 34b either by hand or in response to some variable condition, the bridge will be unbalanced and a signal voltage of predetermined phase relation will be applied to the input side of phase shifter 16. This signal voltage will cause the motor M to operate in a direction such that the armature 36 will be displaced in a direction tending to rebalance the inductance bridge. The action is such that the motor speed will pulsate and cause a slight oscillation of the armature 36 to energize the motor periodically, and the average speed of the motor will depend upon the amount of displacement of the core 34a from its central position. When the core 34a is displaced in the opposite direction, the motor M is operated in the reverse direction and the speed of the motor will depend upon the amount of displacement of the core from its central position.

In Figure 4 equalizer 19 is shown connected between phase shifter 16 and transformer 10, but it could be connected in front of phase shifter 16 if desired.

It is obvious that other forms of speed responsive devices involving a drag action established between a rotating element driven by the motor shaft and a reversible element which controls the movement of the core member associated with the inductance bridge may be used. For example, in the arrangement shown in Figure 5 the drag is produced by means of a two-gear fluid pump P of known construction involving two meshing gears enclosed within a casing which fits closely around the outer periphery of the two gears except at the center of the pump. One of the gears, for example the upper gear, is driven from the motor shaft Md and the pump is freely suspended from this shaft and can oscillate about the shaft. Arm 31a extending from the lower end of the pump carries a magnetic core 36a which normally extends partly into each of inductance coils 35a and 35b which correspond to like numbered coils in Figure 4 and also to the two halves of coil 27 in Figure 2. The inlet and outlet ports of the pump are connected by a pipe 38 which includes a throttle valve 39 to restrict the flow of fluid or liquid through the pump.

The operation of Figure 5 is believed to be obvious. When the motor is not running, the pump under the action of gravity or suitable biasing springs will assume its normal position where the core 36a extends into the two coils by equal amounts and the bridge is balanced. When the motor rotates in one direction, there will be a drag on the housing of the pump tending to rotate the housing about the shaft, and the amount of drag will depend upon the adjustment of valve 39. The drag on the housing causes the core 36 to move from its normal position and increase the inductance of one coil while decreasing the inductance of the other. When the motor reverses, the drag on the pump also reverses, and the core moves from its normal position in the other direction and increases the inductance of the second coil while decreasing the inductance of the first. The device of Figure 5 may be employed in the circuit of Figure 4, or it may be connected as in Figure 2 and used in the circuit of Figure 1.

In case it is desired to control the speed of th motor for operation in one direction only in response to an input signal which varies in magnitude and does not change in sense or direction, it is obvious that only one gaseous discharge tube is required.

In all forms of the invention disclosed herein, the speed responsive device supplies a supplemental or additional A. C. biasing voltage to the grid circuit of the control tube or tubes having the same frequency as the normal suppressing voltage, and this additional biasing voltage has a phase relation which tends to prevent firing of the tube, that is, it lags behind the anode voltage and leads the normal suppressing voltage. While I prefer to have the supplemental biasing voltage in quadrature phase relation with respect to the normal suppressing bias, this exact phase relation is not necessary and a different phase displacement may be employed. The essential consideration is that the additional biasing voltage should have a phase relation which when combined with the normal suppressing voltage will cause a decrease in the angle of lag of the resultant A. C. biasing voltage behind the anode voltage of the tube which is active.

For the purpose of illustration, I have shown in Figure 1c a shaded pole dynamo having only one shaded pole winding for each pole piece, but it will be understood that other known types of shaded pole dynamos may be employed. For example, the dynamo may have two shaded pole windings for each pole piece, one located at the leading tip and the other at the trailing tip of the pole. In this case, for the pilot generator the two leading tip windings would be connected in series-aiding relation, and the two trailing tip windings would be connected in series-aiding relation, and the two sets of series connected windings would be connected in series opposition.

I claim:

1. A speed control circuit comprising, in combination, a motor, a source of alternating current, a gaseous discharge tube having an anode circuit and a grid circuit, said anode circuit being connected to supply current to said motor from said source, means for supplying a biasing voltage to said grid circuit from said source substantially opposite in phase to the anode voltage of said tube and having an amplitude sufficient normally to prevent firing of said tube, means for supplying to said grid circuit a signal voltage to cause firing of said tube throughout each positive alternation of the anode voltage, and speed responsive means driven by said motor for applying to said grid circuit an additional biasing voltage of the same frequency as said source and being variable in amplitude with the speed of said motor, said additional biasing voltage having a phase relation which leads said first biasing voltage and tends to prevent firing of said tube.

2. A speed control circuit according to claim 1 wherein said signal voltage is an alternating current voltage which leads the anode voltage by substantially 90°, and said additional biasing voltage is substantially opposite in phase to said signal voltage.

3. A speed responsive circuit according to claim 1 wherein said speed responsive means comprises a shaded pole dynamo driven by said motor and having a field winding energized from said source and two shaded pole windings connected in series opposition for supplying said additional biasing voltage to said grid circuit.

4. A speed control circuit according to claim 1 wherein said speed responsive means comprises a normally balanced inductance bridge energized from said source and having a movable core element and including means responsive to the speed of said motor for displacing said core element from its balanced position.

5. A speed control circuit comprising, in combination, a motor, a source of alternating current, a pair of gaseous discharge tubes each having an anode circuit and a grid circuit, the anode circuit of one tube being connected to supply current to said motor for operation in one direction and the anode circuit of the other tube supplying current to said motor for operation in the reverse direction, the anode voltages of said tubes being of the same phase, means for supplying from said source to both grid circuits a biasing voltage substantially opposite in phase to said anode voltages and of an amplitude sufficient narmally to prevent firing of said tubes, means for supplying to said grid circuits signal voltages of opposite sense to cause firing of one of said tubes throughout each positive alternation of the anode voltage and to prevent firing of the other tube, and speed responsive means driven by said motor for applying to said grid circuits additional biasing voltages of opposite phase and of the same frequency as said source and being variable in amplitude with the speed of said motor, said additional biasing voltage applied to the grid of the operating tube having a phase relation which leads said first biasing voltage and tends to prevent firing of said tube.

6. A speed control circuit according to claim 5 wherein said signal voltages are alternating current voltages which respectively lead and lag the anode voltages by substantially 90°, and said additional biasing voltages are substantially opposite in phase to said signal voltages.

7. A speed control circuit according to claim 5 wherein said speed responsive means comprises a shaded pole dynamo driven by said motor and having a field winding energized from said source and two shaded pole windings connected in series opposition for supplying said additional voltages to said grid circuits.

8. A speed control circuit according to claim 5 wherein said additional biasing voltages are supplied from a balanced inductance bridge having a movable core, and including means responsive to the two directions of operation of said motor for moving said core in opposite directions from its balancing position.

9. A speed control circuit according to claim 5 wherein said additional biasing voltage is supplied from a normally balanced bridge circuit energized from said source, and including a movable element movable in opposite directions for unbalancing said bridge in opposite senses, and means responsive to operation of said motor in opposite directions for moving said movable element in opposite directions from its normal position.

10. A speed control circuit comprising, in combination, a reversible motor, a source of alternating current, a pair of gaseous discharge tubes for controlling circuits to operate said motor from said source in forward and reverse directions respectively, the anode circuits of said tubes being energized by voltages having the same phase relation, means for supplying to the grid circuits of said tubes alternating suppressing voltages of the same phase and of an amplitude to normally prevent firing of said tubes, a pair of impedance paths connected in parallel across said source, a bridging circuit connected between equi-potential points on said paths and connected to supply to said grid circuits signal voltages of opposite phase for controlling the firing of said tubes, signalling means for unbalancing one of said impedance paths to supply signal voltages to said tubes, and means responsive to the speed of said motor for unbalancing the second impedance path in a direction tending to reduce the current in said bridging path.

11. A speed control circuit comprising, in combination, a motor, a source of alternating current, a gaseous discharge tube having an anode circuit and a grid circuit, said anode circuit being connected to supply current to said motor from said source, means for supplying a main biasing voltage to said grid circuit from said source and having an amplitude and phase normally to prevent firing of said tube, means for supplying to said grid circuit an alternating signal voltage of the same frequency as said source and having a lagging phase with respect to said biasing voltage to cause firing of said tube throughout each positive alternation of the anode voltage, and speed responsive means driven by said motor for applying to said grid circuit an additional alternating biasing voltage of the same frequency as said source and having a leading phase relation with respect to said main biasing voltage, said additional biasing voltage being variable in amplitude with the speed of said motor.

12. A control circuit comprising, in combination, a motor, a source of alternating current, a gaseous discharge tube having an anode circuit and a grid circuit, said anode circuit being connected to supply current to said motor from said source, means for supplying a main biasing voltage to said grid circuit from said source substantially opposite in phase to the anode voltage of said tube and having an amplitude sufficient normally to prevent firing of said tube, means for supplying to said grid circuit an alternating signal voltage which lags said biasing voltage by substantially 90° to cause firing of said tube throughout each positive alternation of the anode voltage, and means operated by said motor for applying to said grid circuit an additional biasing voltage of a magnitude proportional to the speed of said motor and of the same frequency as said source and having a phase relation which leads said main biasing voltage by substantially 90°.

13. A speed control circuit according to claim 10 wherein one of said impedance paths connected across said source includes inductance elements located on opposite sides of the point of connection of said bridging path, and said speed responsive means includes a movable core for varying the impedance of said inductance elements in opposite directions.

14. A motor control circuit comprising, in combination, a reversible motor, a source of alternating current, a pair of gaseous discharge tubes for controlling circuits to operate said motor from said source in forward and reverse directions respectively, the anode circuits of said tubes being energized by voltages having the same phase relation, means for supplying to the grid circuits of said tubes alternating suppressing voltages of the same phase and of an amplitude to normally prevent firing of said tubes, a pair of impedance paths connected in parallel across said source, a bridging circuit connected between equi-potential points on said paths and connected to supply to said grid circuits signal voltages of opposite phase for controlling the firing of said tubes, movable control means for unbalancing one of said impedance paths to supply signal voltages to said tubes, and movable control means responsive to the direction of operation of said motor for unbalancing the second impedance path in a direction tending to reduce the current in said bridging path.

PAUL GLASS.

REFERENCES CITED

The following references are of record in the file of this patent:

UNITED STATES PATENTS

| Number | Name | Date |
|---|---|---|
| 2,115,086 | Riggs | Apr. 26, 1938 |
| 2,134,901 | Wey | Nov. 1, 1938 |
| 2,211,114 | Harrison | Aug. 13, 1940 |
| 2,113,436 | Williams | Apr. 5, 1938 |
| Re. 20,418 | Howe | June 22, 1937 |
| 1,423,518 | Espenscheid | July 25, 1922 |
| 1,910,202 | Crago | May 23, 1933 |
| 2,229,968 | Garman | Jan. 28, 1941 |
| 2,287,459 | Uehling | June 23, 1942 |